(12) United States Patent
Shroff et al.

(10) Patent No.: US 12,256,735 B2
(45) Date of Patent: Mar. 25, 2025

(54) INSECTICIDAL COMBINATIONS

(71) Applicant: UPL LTD, Haldia (IN)

(72) Inventors: Jaidev Rajnikant Shroff, Dubai (AE); Vikram Rajnikant Shroff, Dubai (AE); Srinivasan Rengan, Mumbai (IN)

(73) Assignee: UPL LTD, West Bengal (IN)

( * ) Notice: Subject to any disclaimer, the term of this patent is extended or adjusted under 35 U.S.C. 154(b) by 924 days.

(21) Appl. No.: 17/265,290

(22) PCT Filed: Aug. 27, 2019

(86) PCT No.: PCT/IB2019/057186
§ 371 (c)(1),
(2) Date: Feb. 2, 2021

(87) PCT Pub. No.: WO2020/044215
PCT Pub. Date: Mar. 5, 2020

(65) Prior Publication Data
US 2021/0298304 A1    Sep. 30, 2021

(30) Foreign Application Priority Data
Aug. 28, 2018  (IN) .............................. 201831032119

(51) Int. Cl.
*A01N 43/56*     (2006.01)
*A01N 47/24*     (2006.01)
*A01N 53/00*     (2006.01)

(52) U.S. Cl.
CPC ............. *A01N 43/56* (2013.01); *A01N 47/24* (2013.01); *A01N 53/00* (2013.01)

(58) Field of Classification Search
CPC ......... A01N 43/56; A01N 47/24; A01N 53/00
See application file for complete search history.

(56) References Cited

U.S. PATENT DOCUMENTS

2012/0214857 A1    8/2012   Reinhard et al.

FOREIGN PATENT DOCUMENTS

| CA | 2813715 A1 | * | 4/2012 | ............. A01N 31/14 |
|----|------------|---|--------|----|
| CN | 103190435 A |  | 7/2013 | |
| CN | 104663693 A1 | * | 6/2015 | |
| CN | 106342875 A |  | 1/2017 | |
| CN | 107148973 A |  | 9/2017 | |
| CN | 107668063 A |  | 2/2018 | |
| EP | 0237227 A1 | * | 9/1987 | ............. A01N 53/00 |
| EP | 2060181 B1 |  | 5/2012 | |
| WO | WO-2017049141 A1 | * | 3/2017 | ............. A01N 25/04 |

OTHER PUBLICATIONS

International Search Report and Written Opinion for International Application PCT/IB2019/057186; International Filing Date: Aug. 27, 2019; Date of Mailing: Nov. 1, 2019; 10 pages.

* cited by examiner

*Primary Examiner* — James H Alstrum-Acevedo
*Assistant Examiner* — Pierre Paul Eleniste
(74) *Attorney, Agent, or Firm* — CANTOR COLBURN LLP

(57) ABSTRACT

An Insecticidal combination comprising at least one diamide insecticide; at least one pyrethroid selected and at least one mitochondrial complex III electron transport inhibitor.

4 Claims, No Drawings

INSECTICIDAL COMBINATIONS

CROSS REFERENCE TO RELATED APPLICATIONS

This application is a National Stage application of PCT/IB2019/057186, filed Aug. 27, 2019, which claims the benefit of priority to Indian patent application No. 201831032119, filed Aug. 28, 2018, both of which are incorporated by reference in their entirety herein.

TECHNICAL FIELD

The present invention relates to combinations comprising a diamide insecticide. The combination is highly suitable for controlling unwanted animal pests, such as insects, acaricides and/or nematodes.

BACKGROUND OF THE INVENTION

Loss of yield due to damage by invertebrate pests is a major problem that most agriculturists face. Modern insecticides and biological control agents are employed to minimize this damage. However, with the growing resistance to insecticides, it is necessary to use newer active ingredients in combination so as to counteract resistance in insect pests.

Diamides insecticides are relatively new group of insecticides which includes flubendiamide, a highly potent lepidoptericide and chlorantraniliprole and its analogue cyantraniliprole. Evolution of diamides can be studied in article published Pest Manag Sci. 2013 January; 69(1):7-14.

Chlorantraniliprole and cyantraniliprole are anthranilic diamide insecticidal compounds which exhibit larvicidal activity as an orally ingested toxicant by targeting and disrupting the $Ca^{2+}$ balance and ryanodine receptor.

Pyrethroids are known to be broad spectrum insecticides. However, with over use resistance to many pyrethroids are now reported specially in crops such as cotton and other crops. There is a need for combinations with pyrethroids to increase the spectrum of control as well as the decrease the resistance.

EP2060181B1 (Annan) teaches combinations of anthranilamide insecticides in combination with Pyrethroids. These combinations however were found to be less effective specially against resistant and hardy pests.

There is therefore a need in the art for combinations of anthranilamide insecticidal compounds with insecticides that help improve spectrum of control. With crop tolerances decreasing, lower use rates being imposed and increasing resistance, there is a need for a combination of actives that allows for broader disease control spectrum that combines curative and preventive actives and has a lower dosage.

Therefore, embodiments of the present invention may ameliorate one or more of the above-mentioned problems:

Therefore, embodiments of the present invention may provide combinations of insecticides that possess an enhanced efficacy over the individual active compound used in isolation.

Another object of the present invention is to provide an insecticide combination that causes an enhanced greening of the crops to which it is administered.

Another object of the present invention is to provide a combination that causes late senescence to the crop to which it is applied thereby resulting into an increasing yield of the crop.

Yet another object of the present invention is to provide a combination that results into reduced pest pressure in the crops to which it is applied.

Another object of the present invention is to provide a combination that achieves increased yield in the crops to which it is applied.

Another object of the present invention is to provide an insecticidal combination that causes an enhanced insecticidal activity.

Another object of the present invention is to provide a combination which enhances the protection to plants from attack or infestation by insects, acarids or nematodes.

Another object of the present invention is to provide a synergist for the anthranilamide insecticides.

Some or all these and other objects of the invention are can be achieved by way of the invention described hereinafter.

SUMMARY OF THE INVENTION

Thus, an aspect of the present invention can provide a combination comprising:
  (a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
  (b) a pyrethroid selected from acrinathrin, allethrin, bioallethrin, esdepallethrin, barthrin, bifenthrin, kappa bifenthrin, bioethanomethrin, brofenvalerate, broflu-thrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and
  (c) at least one mitochondrial complex Ill electron transport inhibitor selected from:
    (i) hydramethylnon;
    (ii) acequinocyl;
    (iii) a methoxyacrylate strobilurin insecticide selected from bifujunzhi, fluacrypyrim, flufenoxystrobin, and pyriminostrobin; and
    (iv) bifenazate.

Yet another aspect of the present invention can provide a composition comprising:
  (a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
  (b) a pyrethroid selected from acrinathrin, allethrin, bioallethrin, esdepallethrin, barthrin, bifenthrin, kappa bifenthrin, bioethanomethrin, brofenvalerate, broflu-thrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and (c) at least one mitochondrial complex III electron transport inhibitor selected from:
  (i) hydramethylnon;
  (ii) acequinocyl;
  (iii) a methoxyacrylate strobilurin insecticide selected from bifujunzhi, fluacrypyrim, flufenoxystrobin, and pyriminostrobin; and
  (iv) bifenazate.

DETAILED DESCRIPTION

The term 'disease control' as used herein denotes control and prevention of a disease. Controlling effects include all deviation from natural development, for example: killing, retardation, decrease of the pests. The term 'plants' refers to all physical parts of a plant, including seeds, seedlings, saplings, roots, tubers, stems, stalks, foliage and fruits. The term "locus" of a plant as used herein is intended to embrace the place on which the plants are growing, where the plant propagation materials of the plants are sown or where the plant propagation materials of the plants will be placed into the soil. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion.

Surprisingly, the insecticidal and/or acaricidal and/or antimicrobial activity or and/or the plant-invigorating activity and/or the yield-enhancing activity of the active compound combinations according to the invention was found to be significantly higher than the sum of the activities of the individual active compounds.

It has surprisingly been found that the addition of at least one mitochondrial complex III electron transport inhibitor to the combination of a pyrethroid insecticide with either a diamide insecticide or a phenylpyrazole insecticide leads to a surprising, unexpected and synergistic enhancement in the efficacy of the combination of a pyrethroid insecticide with either a diamide insecticide or a phenylpyrazole insecticide.

Thus, in an aspect, the present invention provides a combination comprising:
(a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
(b) a pyrethroid selected from acrinathrin, allethrin, bioallethrin, esdepallethrin, barthrin, bifenthrin, kappa bifenthrin, bioethanomethrin, brofenvalerate, broflu-thrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and
(c) at least one mitochondrial complex III electron transport inhibitor selected from:
  (i) hydramethylnon;
  (ii) acequinocyl;
  (iii) a methoxyacrylate strobilurin insecticide selected from bifujunzhi, fluacrypyrim, flufenoxystrobin, and pyriminostrobin; and
  (iv) bifenazate.

In an embodiment, it was surprising that the addition of bifenazate to the combination of diamide insecticides with at least another pyrethroid selected from bifenthrin or kappa bifenthrin resulted in a surprising enhancement of the efficacy. These surprising advantages of the combinations of the invention were not observed when the mitochondrial complex III electron transport inhibitor were not present in the combination. Therefore, these unexpected advantages of the combination of the present invention could be attributed to the inclusion of the mitochondrial complex III electron transport inhibitors to a combination comprising a pyrethroid insecticide with either a diamide insecticide or a phenylpyrazole insecticide.

In an aspect, the combinations of the present invention may be admixed with at least one agrochemically acceptable excipient to prepare a composition according to the present invention.

Thus, in another aspect, the present invention can provide a composition comprising:
(a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
(b) a pyrethroid selected from acrinathrin, allethrin, bioallethrin, esdepallethrin, barthrin, bifenthrin, kappa bifenthrin, bioethanomethrin, brofenvalerate, broflu-thrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and (c) at least one mitochondrial complex III electron transport inhibitor selected from:
  (i) hydramethylnon;
  (ii) acequinocyl;
  (iii) a methoxyacrylate strobilurin insecticide selected from bifujunzhi, fluacrypyrim, flufenoxystrobin, and pyriminostrobin; and
  (iv) bifenazate.

The combinations and/or compositions according to the present invention may be used to control insect pests at a locus.

Therefore, in an aspect, the present invention provides a method of controlling insect pests at a locus, said method comprising applying to the locus a combination or a composition comprising:

(a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;

(b) a pyrethroid selected from acrinathrin, allethrin, bioallethrin, esdepallethrin, barthrin, bifenthrin, kappa bifenthrin, bioethanomethrin, brofenvalerate, brofluthrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and (c) at least one mitochondrial complex III electron transport inhibitor selected from:
  (i) hydramethylnon;
  (ii) acequinocyl;
  (iii) a methoxyacrylate strobilurin insecticide selected from bifujunzhi, fluacrypyrim, flufenoxystrobin, and pyriminostrobin; and
  (iv) bifenazate.

(d) an agrocheically acceptable adjuvant

Each of the aspects described above may have one or more embodiments.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the diamide insecticide or the pyridylpyrazole insecticide may be selected from broflanilide, chlorantraniliprole, cyantraniliprole, cyclaniliprole, cyhalodiamide, flubendiamide, tetrachlorantraniliprole, tyclopyrazoflor or tetraniliprole.

In an embodiment, the diamide insecticide is chlorantraniliprole.

In an embodiment, the diamide insecticide is cyantraniliprole.

In an embodiment, the diamide insecticide is flubendiamide.

In an embodiment, the pyrethroid insecticide may be selected from acrinathrin, allethrin, bioallethrin, esdepallethrin, barthrin, bifenthrin, kappa bifenthrin, bioethanomethrin, brofenvalerate, brofluthrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate.

In an embodiment, the pyrethroid insecticide is bifenthrin or kappa-bifenthrin.

In an embodiment, the pyrethroid insecticide is cyhalothrin, gamma-cyhalothrin, or lambda-cyhalothrin.

In an embodiment, the pyrethroid insecticide is cypermethrin, alpha-cypermethrin, beta-cypermethrin, theta-cypermethrin, or zeta-cypermethrin.

In an embodiment, the pyrethroid insecticide is permethrin.

In an embodiment, the mitochondrial complex III electron transport inhibitor is hydramethylnon.

In an embodiment, the mitochondrial complex III electron transport inhibitor is acequinocyl.

In an embodiment, the mitochondrial complex III electron transport inhibitor is bifujunzhi.

In an embodiment, the mitochondrial complex III electron transport inhibitor is fluacrypyrim.

In an embodiment, the mitochondrial complex III electron transport inhibitor is flufenoxystrobin.

In an embodiment, the mitochondrial complex III electron transport inhibitor is pyriminostrobin.

In an embodiment, the mitochondrial complex III electron transport inhibitor is bifenazate.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic or the application time or the pest pressure or intensity. This amount of the combinations of the present invention to be applied can be readily deduced by a skilled agronomist.

In an embodiment, the combinations of the present invention include the following preferred combinations.

In an embodiment, each individual row appearing in the table below represents the combinations in an embodiment of the present invention.

In the following table, the term bifenthrin means bifenthrin or its isomer kappa-bifenthrin; cyhalothrin means cyhalothrin or any of its isomers gamma-cyhalothrin, or lambda-cyhalothrin; cypermethrin means cypermethrin or any of its isomers alpha-cypermethrin, beta-cypermethrin, theta-cypermethrin, or zeta-cypermethrin.

| S No. | Diamide or Pyridylpyrazole insecticide | Pyrethroid insecticide | Mitochondrial complex III electron transport inhibitor |
|---|---|---|---|
| 1 | Chlorantraniliprole | Bifenthrin | Hydramethylnon |
| 2 | Chlorantraniliprole | Bifenthrin | Acequinocyl |
| 3 | Chlorantraniliprole | Bifenthrin | Bifujunzhi |
| 4 | Chlorantraniliprole | Bifenthrin | Fluacrypyrim |
| 5 | Chlorantraniliprole | Bifenthrin | Flufenoxystrobin |
| 6 | Chlorantraniliprole | Bifenthrin | Pyriminostrobin |
| 7 | Chlorantraniliprole | Bifenthrin | Bifenazate |
| 8 | Chlorantraniliprole | Cyhalothrin | Hydramethylnon |
| 9 | Chlorantraniliprole | Cyhalothrin | Acequinocyl |
| 10 | Chlorantraniliprole | Cyhalothrin | Bifujunzhi |
| 11 | Chlorantraniliprole | Cyhalothrin | Fluacrypyrim |
| 12 | Chlorantraniliprole | Cyhalothrin | Flufenoxystrobin |
| 13 | Chlorantraniliprole | Cyhalothrin | Pyriminostrobin |
| 14 | Chlorantraniliprole | Cyhalothrin | Bifenazate |
| 15 | Chlorantraniliprole | Cypermethrin | Hydramethylnon |
| 16 | Chlorantraniliprole | Cypermethrin | Acequinocyl |
| 17 | Chlorantraniliprole | Cypermethrin | Bifujunzhi |
| 18 | Chlorantraniliprole | Cypermethrin | Fluacrypyrim |
| 19 | Chlorantraniliprole | Cypermethrin | Flufenoxystrobin |
| 20 | Chlorantraniliprole | Cypermethrin | Pyriminostrobin |
| 21 | Chlorantraniliprole | Cypermethrin | Bifenazate |
| 22 | Chlorantraniliprole | Permethrin | Hydramethylnon |
| 23 | Chlorantraniliprole | Permethrin | Acequinocyl |
| 24 | Chlorantraniliprole | Permethrin | Bifujunzhi |
| 25 | Chlorantraniliprole | Permethrin | Fluacrypyrim |
| 26 | Chlorantraniliprole | Permethrin | Flufenoxystrobin |
| 27 | Chlorantraniliprole | Permethrin | Pyriminostrobin |
| 28 | Chlorantraniliprole | Permethrin | Bifenazate |
| 29 | Cyantraniliprole | Bifenthrin | Hydramethylnon |
| 30 | Cyantraniliprole | Bifenthrin | Acequinocyl |
| 31 | Cyantraniliprole | Bifenthrin | Bifujunzhi |
| 32 | Cyantraniliprole | Bifenthrin | Fluacrypyrim |
| 33 | Cyantraniliprole | Bifenthrin | Flufenoxystrobin |
| 34 | Cyantraniliprole | Bifenthrin | Pyriminostrobin |
| 35 | Cyantraniliprole | Bifenthrin | Bifenazate |
| 36 | Cyantraniliprole | Cyhalothrin | Hydramethylnon |
| 37 | Cyantraniliprole | Cyhalothrin | Acequinocyl |
| 38 | Cyantraniliprole | Cyhalothrin | Bifujunzhi |
| 39 | Cyantraniliprole | Cyhalothrin | Fluacrypyrim |
| 40 | Cyantraniliprole | Cyhalothrin | Flufenoxystrobin |
| 41 | Cyantraniliprole | Cyhalothrin | Pyriminostrobin |
| 42 | Cyantraniliprole | Cyhalothrin | Bifenazate |
| 43 | Cyantraniliprole | Cypermethrin | Hydramethylnon |
| 44 | Cyantraniliprole | Cypermethrin | Acequinocyl |
| 45 | Cyantraniliprole | Cypermethrin | Bifujunzhi |
| 46 | Cyantraniliprole | Cypermethrin | Fluacrypyrim |
| 47 | Cyantraniliprole | Cypermethrin | Flufenoxystrobin |
| 48 | Cyantraniliprole | Cypermethrin | Pyriminostrobin |
| 49 | Cyantraniliprole | Cypermethrin | Bifenazate |
| 50 | Cyantraniliprole | Permethrin | Hydramethylnon |
| 51 | Cyantraniliprole | Permethrin | Acequinocyl |
| 52 | Cyantraniliprole | Permethrin | Bifujunzhi |
| 53 | Cyantraniliprole | Permethrin | Fluacrypyrim |
| 54 | Cyantraniliprole | Permethrin | Flufenoxystrobin |
| 55 | Cyantraniliprole | Permethrin | Pyriminostrobin |
| 56 | Cyantraniliprole | Permethrin | Bifenazate |
| 57 | Flubendiamide | Bifenthrin | Hydramethylnon |
| 58 | Flubendiamide | Bifenthrin | Acequinocyl |
| 59 | Flubendiamide | Bifenthrin | Bifujunzhi |
| 60 | Flubendiamide | Bifenthrin | Fluacrypyrim |
| 61 | Flubendiamide | Bifenthrin | Flufenoxystrobin |
| 62 | Flubendiamide | Bifenthrin | Pyriminostrobin |
| 63 | Flubendiamide | Bifenthrin | Bifenazate |
| 64 | Flubendiamide | Cyhalothrin | Hydramethylnon |
| 65 | Flubendiamide | Cyhalothrin | Acequinocyl |
| 66 | Flubendiamide | Cyhalothrin | Bifujunzhi |
| 67 | Flubendiamide | Cyhalothrin | Fluacrypyrim |
| 68 | Flubendiamide | Cyhalothrin | Flufenoxystrobin |
| 69 | Flubendiamide | Cyhalothrin | Pyriminostrobin |
| 70 | Flubendiamide | Cyhalothrin | Bifenazate |
| 71 | Flubendiamide | Cypermethrin | Hydramethylnon |
| 72 | Flubendiamide | Cypermethrin | Acequinocyl |
| 73 | Flubendiamide | Cypermethrin | Bifujunzhi |
| 74 | Flubendiamide | Cypermethrin | Fluacrypyrim |
| 75 | Flubendiamide | Cypermethrin | Flufenoxystrobin |
| 76 | Flubendiamide | Cypermethrin | Pyriminostrobin |
| 77 | Flubendiamide | Cypermethrin | Bifenazate |
| 78 | Flubendiamide | Permethrin | Hydramethylnon |
| 79 | Flubendiamide | Permethrin | Acequinocyl |
| 80 | Flubendiamide | Permethrin | Bifujunzhi |
| 81 | Flubendiamide | Permethrin | Fluacrypyrim |
| 82 | Flubendiamide | Permethrin | Flufenoxystrobin |
| 83 | Flubendiamide | Permethrin | Pyriminostrobin |
| 84 | Flubendiamide | Permethrin | Bifenazate |

In an embodiment, the present invention may provide a combination comprising the three insecticides as listed in each individual row from row 1 to row 84 in the table above.

Thus in an embodiment, the present invention may provide combinations or compositions comprising:
(a) at least one diamide insecticide selected from broflanilide, chlorantraniliprole, cyantraniliprole, cyclaniliprole, cyhalodiamide, flubendiamide, tetrachlorantraniliprole, tyclopyrazoflor or tetraniliprole;
(b) at least one pyrethroid selected from bifenthrin or kappa bifenthrin; and
(c) bifenazate.

In an embodiment, the diamide or pyridylpyrazole insecticide is chlorantraniliprole, the pyrethroid insecticide is bifenthrin, and the mitochondrial complex III transport inhibitor is fluacrypyrim.

In an embodiment, the diamide or pyridylpyrazole insecticide is chlorantraniliprole, the pyrethroid insecticide is bifenthrin, and the mitochondrial complex III transport inhibitor is flufenoxystrobin.

In an embodiment, the diamide or pyridylpyrazole insecticide is chlorantraniliprole, the pyrethroid insecticide is bifenthrin, and the mitochondrial complex III transport inhibitor is pyriminostrobin.

In an embodiment, the diamide or pyridylpyrazole insecticide is chlorantraniliprole, the pyrethroid insecticide is bifenthrin, and the mitochondrial complex III transport inhibitor is bifenazate.

In an embodiment, the diamide or pyridylpyrazole insecticide is chlorantraniliprole, the pyrethroid insecticide is cyhalothrin, and the mitochondrial complex III transport inhibitor is fluacrypyrim.

In an embodiment, the diamide or pyridylpyrazole insecticide is chlorantraniliprole, the pyrethroid insecticide is cyhalothrin, and the mitochondrial complex III transport inhibitor is flufenoxystrobin.

In an embodiment, the diamide or pyridylpyrazole insecticide is chlorantraniliprole, the pyrethroid insecticide is cyhalothrin, and the mitochondrial complex III transport inhibitor is pyriminostrobin.

In an embodiment, the diamide or pyridylpyrazole insecticide is chlorantraniliprole, the pyrethroid insecticide is cyhalothrin, and the mitochondrial complex III transport inhibitor is bifenazate.

In an embodiment, the diamide or pyridylpyrazole insecticide is chlorantraniliprole, the pyrethroid insecticide is cypermethrin, and the mitochondrial complex III transport inhibitor is fluacrypyrim.

In an embodiment, the diamide or pyridylpyrazole insecticide is chlorantraniliprole, the pyrethroid insecticide is cypermethrin, and the mitochondrial complex III transport inhibitor is flufenoxystrobin.

In an embodiment, the diamide or pyridylpyrazole insecticide is chlorantraniliprole, the pyrethroid insecticide is cypermethrin, and the mitochondrial complex III transport inhibitor is pyriminostrobin.

In an embodiment, the diamide or pyridylpyrazole insecticide is chlorantraniliprole, the pyrethroid insecticide is cypermethrin, and the mitochondrial complex III transport inhibitor is bifenazate.

In an embodiment, the diamide or pyridylpyrazole insecticide is chlorantraniliprole, the pyrethroid insecticide is permethrin, and the mitochondrial complex III transport inhibitor is fluacrypyrim.

In an embodiment, the diamide or pyridylpyrazole insecticide is chlorantraniliprole, the pyrethroid insecticide is permethrin, and the mitochondrial complex III transport inhibitor is flufenoxystrobin.

In an embodiment, the diamide or pyridylpyrazole insecticide is chlorantraniliprole, the pyrethroid insecticide is permethrin, and the mitochondrial complex III transport inhibitor is pyriminostrobin.

In an embodiment, the diamide or pyridylpyrazole insecticide is chlorantraniliprole, the pyrethroid insecticide is permethrin, and the mitochondrial complex III transport inhibitor is bifenazate.

In an embodiment, the diamide or pyridylpyrazole insecticide is cyantraniliprole, the pyrethroid insecticide is bifenthrin, and the mitochondrial complex III transport inhibitor is fluacrypyrim.

In an embodiment, the diamide or pyridylpyrazole insecticide is cyantraniliprole, the pyrethroid insecticide is bifenthrin, and the mitochondrial complex III transport inhibitor is flufenoxystrobin.

In an embodiment, the diamide or pyridylpyrazole insecticide is cyantraniliprole, the pyrethroid insecticide is bifenthrin, and the mitochondrial complex III transport inhibitor is pyriminostrobin.

In an embodiment, the diamide or pyridylpyrazole insecticide is cyantraniliprole, the pyrethroid insecticide is bifenthrin, and the mitochondrial complex III transport inhibitor is bifenazate.

In an embodiment, the diamide or pyridylpyrazole insecticide is cyantraniliprole, the pyrethroid insecticide is cyhalothrin, and the mitochondrial complex III transport inhibitor is fluacrypyrim.

In an embodiment, the diamide or pyridylpyrazole insecticide is cyantraniliprole, the pyrethroid insecticide is cyhalothrin, and the mitochondrial complex III transport inhibitor is flufenoxystrobin.

In an embodiment, the diamide or pyridylpyrazole insecticide is cyantraniliprole, the pyrethroid insecticide is cyhalothrin, and the mitochondrial complex III transport inhibitor is pyriminostrobin.

In an embodiment, the diamide or pyridylpyrazole insecticide is cyantraniliprole, the pyrethroid insecticide is cyhalothrin, and the mitochondrial complex III transport inhibitor is bifenazate.

In an embodiment, the diamide or pyridylpyrazole insecticide is cyantraniliprole, the pyrethroid insecticide is cypermethrin, and the mitochondrial complex III transport inhibitor is fluacrypyrim.

In an embodiment, the diamide or pyridylpyrazole insecticide is cyantraniliprole, the pyrethroid insecticide is cypermethrin, and the mitochondrial complex III transport inhibitor is flufenoxystrobin.

In an embodiment, the diamide or pyridylpyrazole insecticide is cyantraniliprole, the pyrethroid insecticide is cypermethrin, and the mitochondrial complex III transport inhibitor is pyriminostrobin.

In an embodiment, the diamide or pyridylpyrazole insecticide is cyantraniliprole, the pyrethroid insecticide is cypermethrin, and the mitochondrial complex III transport inhibitor is bifenazate.

In an embodiment, the diamide or pyridylpyrazole insecticide is cyantraniliprole, the pyrethroid insecticide is permethrin, and the mitochondrial complex III transport inhibitor is fluacrypyrim.

In an embodiment, the diamide or pyridylpyrazole insecticide is cyantraniliprole, the pyrethroid insecticide is permethrin, and the mitochondrial complex III transport inhibitor is flufenoxystrobin.

In an embodiment, the diamide or pyridylpyrazole insecticide is cyantraniliprole, the pyrethroid insecticide is permethrin, and the mitochondrial complex III transport inhibitor is pyriminostrobin.

In an embodiment, the diamide or pyridylpyrazole insecticide is cyantraniliprole, the pyrethroid insecticide is permethrin, and the mitochondrial complex III transport inhibitor is bifenazate.

In an embodiment, the diamide or pyridylpyrazole insecticide is flubendiamide, the pyrethroid insecticide is bifenthrin, and the mitochondrial complex III transport inhibitor is fluacrypyrim.

In an embodiment, the diamide or pyridylpyrazole insecticide is flubendiamide, the pyrethroid insecticide is bifenthrin, and the mitochondrial complex III transport inhibitor is flufenoxystrobin.

In an embodiment, the diamide or pyridylpyrazole insecticide is flubendiamide, the pyrethroid insecticide is bifenthrin, and the mitochondrial complex III transport inhibitor is pyriminostrobin.

In an embodiment, the diamide or pyridylpyrazole insecticide is flubendiamide, the pyrethroid insecticide is bifenthrin, and the mitochondrial complex III transport inhibitor is bifenazate.

In an embodiment, the diamide or pyridylpyrazole insecticide is flubendiamide, the pyrethroid insecticide is cyhalothrin, and the mitochondrial complex III transport inhibitor is fluacrypyrim.

In an embodiment, the diamide or pyridylpyrazole insecticide is flubendiamide, the pyrethroid insecticide is cyhalothrin, and the mitochondrial complex III transport inhibitor is flufenoxystrobin.

In an embodiment, the diamide or pyridylpyrazole insecticide is flubendiamide, the pyrethroid insecticide is cyhalothrin, and the mitochondrial complex III transport inhibitor is pyriminostrobin.

In an embodiment, the diamide or pyridylpyrazole insecticide is flubendiamide, the pyrethroid insecticide is cyhalothrin, and the mitochondrial complex III transport inhibitor is bifenazate.

In an embodiment, the diamide or pyridylpyrazole insecticide is flubendiamide, the pyrethroid insecticide is cypermethrin, and the mitochondrial complex III transport inhibitor is fluacrypyrim.

In an embodiment, the diamide or pyridylpyrazole insecticide is flubendiamide, the pyrethroid insecticide is cypermethrin, and the mitochondrial complex III transport inhibitor is flufenoxystrobin.

In an embodiment, the diamide or pyridylpyrazole insecticide is flubendiamide, the pyrethroid insecticide is cypermethrin, and the mitochondrial complex III transport inhibitor is pyriminostrobin.

In an embodiment, the diamide or pyridylpyrazole insecticide is flubendiamide, the pyrethroid insecticide is cypermethrin, and the mitochondrial complex III transport inhibitor is bifenazate.

In an embodiment, the diamide or pyridylpyrazole insecticide is flubendiamide, the pyrethroid insecticide is permethrin, and the mitochondrial complex III transport inhibitor is fluacrypyrim.

In an embodiment, the diamide or pyridylpyrazole insecticide is flubendiamide, the pyrethroid insecticide is permethrin, and the mitochondrial complex III transport inhibitor is flufenoxystrobin.

In an embodiment, the diamide or pyridylpyrazole insecticide is flubendiamide, the pyrethroid insecticide is permethrin, and the mitochondrial complex III transport inhibitor is pyriminostrobin.

In an embodiment, the diamide or pyridylpyrazole insecticide is flubendiamide, the pyrethroid insecticide is permethrin, and the mitochondrial complex III transport inhibitor is bifenazate.

In an embodiment, the total amount of diamide insecticidal compound in the composition may typically be in the range of 0.1 to 99% by weight, preferably 0.2 to 90% by weight. The total amount of pyrethroid in the composition may be in the range of 0.1 to 99% by weight. The total amount of bifenazate in the composition may be in the range of 0.1 to 99% by weight.

In an embodiment, the constituent fungicides of the combination of the present invention may be admixed in ratio of (1-80):(1-80):(1-80) of the, anthranilamide insecticidal compound, pyrethroid compound and bifenazate respectively.

In an embodiment, the combinations or compositions or methods of the present invention comprise at least a fourth agrochemical active ingredient.

In an embodiment, the additional agrochemical active ingredient is a fungicide.

In an embodiment, the fungicide is a strobilurin fungicide. In this embodiment, the addition of a strobilurin fungicide has been found to be specifically beneficial and potentiating.

In an embodiment, the strobilurin fungicide is selected from fluoxastrobin, mandestrobin, pyribencarb, azoxystrobin, bifujunzhi, coumoxystrobin, enoxastrobin, flufenoxystrobin, jiaxiangjunzhi, picoxystrobin, pyraoxystrobin, pyraclostrobin, pyrametostrobin, triclopyricarb, dimoxystrobin, fenaminstrobin, metominostrobin, orysastrobin, kresoxim-methyl, and trifloxystrobin.

In an embodiment, the strobilurin fungicide is azoxystrobin.

In an embodiment, the strobilurin fungicide is bifujunzhi.

In an embodiment, the strobilurin fungicide is flufenoxystrobin.

In an embodiment, the strobilurin fungicide is jiaxiangjunzhi.

In an embodiment, the strobilurin fungicide is picoxystrobin.

In an embodiment, the strobilurin fungicide is kresoxim-methyl.

In an embodiment, the strobilurin fungicide is trifloxystrobin.

In an embodiment, the combinations of the present invention may be applied to the locus either simultaneously or sequentially, such that the diamide insecticide or the pyridylpyrazole insecticide, the pyrethroid insecticide and the mitochondrial complex III electron transport inhibitor may be applied in a tank mix or as a pre-mixed composition.

Thus, in this aspect, the present invention provides a tank-mix comprising:
(a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
(b) a pyrethroid selected from acrinathrin, allethrin, bioallethrin, esdepallethrin, barthrin, bifenthrin, kappa bifenthrin, bioethanomethrin, brofenvalerate, brofluthrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and
(c) at least one mitochondrial complex Ill electron transport inhibitor selected from:
(i) hydramethylnon;
(ii) acequinocyl;
(iii) a methoxyacrylate strobilurin insecticide selected from bifujunzhi, fluacrypyrim, flufenoxystrobin, and pyriminostrobin; and
(iv) bifenazate.

The method of control of the present invention may be carried out by spraying the suggested tank mixes, or the individual insecticides may be formulated as a kit-of-parts containing various components that may be mixed as instructed prior to spraying.

In an embodiment, the present invention provides a kit-of-parts comprising a plurality of components, wherein said plurality of components comprises:
(a) a diamide insecticide or a pyridylpyrazole insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
(b) a pyrethroid selected from acrinathrin, allethrin, bioallethrin, esdepallethrin, barthrin, bifenthrin, kappa bifenthrin, bioethanomethrin, brofenvalerate, brofluthrinate, bromethrin, butethrin, chlorempenthrin, cyclethrin, cyclprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, renofluthrin, meperfluthrin, resmethrin, bioresmethrin, cismethrin, tefluthrin, kappa-tefluthrin, terallethrin, tetramethylfluthrin, tralocythrin, transfluthrin, or valerate; and (c) at least one mitochondrial complex III electron transport inhibitor selected from:
(i) hydramethylnon;
(ii) acequinocyl;
(iii) a methoxyacrylate strobilurin insecticide selected from bifujunzhi, fluacrypyrim, flufenoxystrobin, and pyriminostrobin; and
(iv) bifenazate.

In an embodiment, the kit-of-parts comprises an instructions manual, said instructions manual comprising instructions directing a user to admix the components before being used.

In an embodiment, the components of the present invention may be packaged such that the components may be packaged separately and then tank mixed before the spraying.

In another embodiment, the components of the present invention may be packaged such that the active components may be packaged separately, whereas other additives are packaged separately, such that the two maybe tank mixed at the time of spraying.

In an embodiment, the constituents of the composition of the present invention may be tank mixed and sprayed at the locus of the pest infestation, or may be alternatively be mixed with surfactants and then sprayed.

In an embodiment, the constituents of the composition of the present invention may be used for foliar application, ground or applications to plant propagation materials.

In an embodiment, the compositions of the present invention may typically be produce by mixing the actives in the composition with an inert carrier, and adding surfactants and other adjuvants and carriers as needed and formulated into solid, or liquid formulations, including but not limited to wettable powders, granules, dusts, Soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

In an embodiment the insect pests controlled by the combinations of the present invention may belong to the class Insecta, Arachnida and Nematoda. Exemplary pests may include: from the order Lepidoptera, pests such as *Acleris* spp., *Adoxophyes* spp., *Aegeria* spp., *Agrotis* spp., *Alabama argillaceae*, *Amylois* spp., *Anticarsia gemmatalis*, *Archips* spp., Argyrotaenia spp., *Autographa* spp., *Busseola fusca*, *Cadra cautella*, *Carposina nipponensis*, *Chilo* spp., *Choristoneura* spp., *Clysia ambiguella*, *Cnaphalocrocis* spp., *Cnephasia* spp., *Cochylis* spp., *Coleophora* spp., *Crocidolomia* spp., *Cryptophlebia leucotreta*, *Crysodeixis includens*, *Cydia* spp., *Diatraea* spp., *Diparopsis castanea*, *Earias* spp., *Elasmopalpus* spp., *Ephestia* spp., *Eucosma* spp., *Eupoecilia ambiguella*, *Euproctis* spp., *Euxoa* spp., *Grapholita* spp., *Hedya nubiferana*, *Heliothis* spp., *Hellula undalis*, *Hyphantria cunea*, *Keiferia lycopersicella*, *Leucoptera scitella*, *Lithocollethis* spp., *Lobesia botrana*, *Lymantria* spp., *Lyonetia* spp., *Malacosoma* spp., *Mamestra brassicae*, *Manduca sexta*, *Operophtera* spp., *Ostrinia nubilalis*, *Pammene* spp., *Pandemis* spp., *Panolis flammea*, *Pectinophora gossypiella*, *Phthorimaea operculella*, *Pieris rapae*, *Pieris* spp., *Plutella xylostella*, *Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusiani* and *Yponomeuta* spp.; from the order Coleoptera, pest such as *Agriotes* spp., *Anthonomus* spp., *Atomaria linearis*, *Ceutorhynchus* spp., *Chaetocnema tibialis*, *Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata*, *Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp., *Scarabeidae*, *Sitophilus* spp., *Sitotroga* spp., *Tenebrio* spp., *Tribolium* spp. and *Trogoderma* spp.; from the order Orthoptera, pests such as *Blatta* spp., *Blattella* spp., *Gryllotalpa* spp., *Leucophaea maderae*, *Locusta* spp., *Periplaneta* spp. and *Schistocerca* spp.; from the order Isoptera, pests such as *Reticulitermes* spp.; from the order Psocoptera pest such as, *Liposcelis* spp.; from the order Anoplura, pests such as *Haematopinus* spp., *Linognathus* spp., *Pediculus* spp., *Pemphigus* spp. and *Phylloxera* spp.; from the order Mallophaga pests such as *Damalinea* spp. and *Trichodectes* spp.; rom the order Thysanoptera, pests such as *Frankliniella* spp., *Hercinothrips* spp., *Taeniothrips* spp., *Thrips palmi*, *Thrips tabaci* and *Scirtothrips aurantii*; from the order Heteroptera, pests such as *Dichelops melacanthus*, *Distantiella theobroma*, *Dysdercus* spp., *Euchistus* spp., *Eurygaster* spp., *Leptocorisa* spp., *Nezara* spp., *Piesma* spp., *Rhodnius* spp., *Sahlbergella singularis*, *Scotinophara* spp. and *Triatoma* spp.; from the order Homoptera, insect pests such as *Aleurothrixus floccosus, Aleyrodes brassicae, Aonidiella* spp., *Aphididae, Aphis* spp., *Aspidiotus* spp., *Bemisia tabaci, Ceroplaster* spp., *Chrysomphalus aonidium, Chrysomphalus dictyospermi, Coccus hesperidum, Empoasca* spp., *Eriosoma larigerum, Erythroneura* spp., *Gascardia* spp., *Laodelphax* spp., *Lecanium corni, Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica, Quadraspidiotus* spp., *Rhopalosiphum* spp., *Saissetia* spp., *Scaphoideus* spp., *Schizaphis* spp., *Sitobion* spp., *Trialeurodes vaporariorum, Trioza erytreae* and *Unaspis citri*; from the order Hymenoptera, insect pests such as *Acromyrmex, Athalia rosae, Atta* spp., *Cephus* spp., *Diprion* spp., *Diprionidae, Gilpinia polytoma, Hoplocampa* spp., *Lasius* spp., *Monomorium pharaonis, Neodiprion* spp., *Solenopsis* spp. and *Vespa* spp.; from the order Diptera, insect pests such as *Antherigona soccata, Bibio hortulanus, Ceratitis* spp., *Chrysomyia* spp., *Culex* spp., *Cuterebra* spp., *Dacus* spp., *Delia* spp., *Drosophila melanogaster, Liriomyza* spp., *Melanagromyza* spp., *Orseolia* spp., *Oscinella frit, Pegomyia hyoscyami, Phorbia* spp., *Rhagoletis pomonella, Sciara* spp.; from the order *Acarina*, pests such as *Acarus siro, Aceria sheldoni, Aculus schlechtendali, Amblyomma* spp., *Argas* spp., *Brevipalpus* spp., *Bryobia praetiosa, Calipitrimerus* spp., *Chorioptes* spp., *Dermanyssus gallinae, Eotetranychus carpini, Eriophyes* spp., *Hyalomma* spp., *Olygonychus pratensis, Ornithodoros* spp., *Panonychus* spp., *Phyllocoptruta* spp. (such as *Phyllocoptruta oleivora*), *Polyphagotarsonemus latus, Psoroptes* spp., *Rhipicephalus* spp., Rhizoglyphus spp., *Sarcoptes* spp., Tarsonemus spp. and *Tetranychus* spp.; and from the class Nematoda, the species of *Meloidogyne* spp. (for example, *Meloidogyne incoginita* and *Meloidogyne javanica*), *Heterodera* spp. (for example, *Heterodera glycines, Heterodera schachtii, Heterodora avenae* and *Heterodora trifolii*), *Globodera* spp. (for example, *Globodera rostochiensis*), *Radopholus* spp. (for example, *Radopholus similes*), *Rotylenchulus* spp., *Pratylenchus* spp. (for example, *Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Quinisulcius* spp., *Scutellonema* spp., *Xiphinema* spp., and *Tylenchorhynchus* spp.

The compositions of the present invention can be used in agricultural lands such as fields, paddy fields, lawns and orchards or in non-agricultural lands. The present invention may be used to control pests in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc., liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *Zelkova*, Japanese *arborvitae*, fir wood, hemlock, juniper, *Pinus, Picea*, and *Taxus* cuspidate, etc.

In an aspect the present invention may provide a method of improving the yield of a crop, said method comprising, applying to the locus of the crop a combination comprising:

(a) at least one diamide insecticide;

(b) at least pyrethroid selected from bifenthrin or kappa bifenthrin; and (c) bifenazate.

The combinations of the present invention may be sold as a pre-mix composition or a kit of parts such that individual actives may be mixed before spraying. Alternatively, the kit of parts may contain the bifenazate and a pyrethroid selected from either bifenthrin or kappa bifenthrin and the diamide insecticide may be admixed with an adjuvant such that the two components may be tank mixed before spraying.

The composition of the present invention maybe applied simultaneously as a tank mix or a formulation or may be applied sequentially. The application may be made to the soil before emergence of the plants, either pre-planting or post-planting. The application may be made as a foliar spray at different timings during crop development.

As demonstrated, the addition of bifenazate to a combination of diamide insecticidal compound which are combined with pyrethroids, greatly improved the disease control as well as improved yield and demonstrated a synergistic effect.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Example 1

Trials were conducted to test the efficacy of the combination of Chlorantraniliprole+Bifenthrin+Bifenazate on mites in Brinjal:

TABLE 1

| Sr. No. | Treatments | Dose (gm. ai/ha) | % mortality |||| 
|---|---|---|---|---|---|---|
| | | | 3 DAA | 7 DAA | 10 DAA | 14 DAA |
| T-1 | Chlorantraniliprole + Bifenthrin + Bifenazate | 22.5 + 40 + 90 | 84 | 93.1 | 93.1 | 81 |
| T-2 | Chlorantraniliprole + Bifenthrin + Bifenazate | 30 + 60 + 120 | 86 | 96 | 94.1 | 88 |
| T3 | Chlorantraniliprole | 30 | 9.9 | 8.9 | 7.9 | 10.9 |
| T-4 | Bifenthrin | 40 | 75 | 80 | 75 | 65 |
| T-5 | Bifenazate | 150 | 65 | 95.1 | 85 | 75 |
| T-6 | Control | 0 | 0 | 0 | 0 | 0 |

Conclusion:

Chlorantraniliprole+Bifenthrin+Bifenazate at the dosage of 22.5+40+90

And 30+60+120 showed synergistic increased control of Brinjal mites than solo application of Chlorantraniliprole, Bifenthrin and Bifenazate.

Example 2

Trials were conducted to test the efficacy of the combination of Chlorantraniliprole+Bifenthrin+Bifenazate on *Lucinodes arbonalis* in Brinjal:

TABLE 2

| Sr. No. | Treatments | Dose (gm. ai/ha) | % mortality |||| 
|---|---|---|---|---|---|---|
| | | | 3 DAA | 7 DAA | 10 DAA | 14 DAA |
| T-1 | Chlorantraniliprole + Bifenthrin + Bifenazate | 22.5 + 40 + 90 | 84 | 93.1 | 94.1 | 81 |
| T-2 | Chlorantraniliprole + Bifenthrin + Bifenazate | 30 + 60 + 120 | 86 | 96 | 94.1 | 88 |
| T3 | Chlorantraniliprole | 30 | 80 | 90.1 | 89.1 | 79 |
| T-4 | Bifenthrin | 40 | 55 | 65 | 53 | 41 |
| T-5 | Bifenazate | 150 | 9.9 | 12 | 10.9 | 7.9 |
| T-6 | Control | 0 | 0 | 0 | 0 | 0 |

Conclusion:

Chlorantraniliprole+Bifenthrin+Bifenazate at the dosage of 22.5+40+90

And 30+60+120 showed synergistic increased control of *Lucinodes arbonalis* than solo application of Chlorantraniliprole, Bifenthrin and Bifenazate.

The invention claimed is:

1. An insecticidal combination comprising:
    (a) a diamide insecticide or a pyridylpyrazole insecticide of chlorantraniliprole;
    (b) a pyrethroid of bifenthrin; and
    (c) a mitochondrial complex III electron transport inhibitor of bifenazate.

2. A composition comprising the combination of claim 1.

3. A method of controlling insect pests at a locus, said method comprising applying to the locus the combination of claim 1.

4. A kit-of-parts comprising a plurality of components, wherein said plurality of components comprises:
    (a) a diamide insecticide or a pyridylpyrazole insecticide of chlorantraniliprole;
    (b) a pyrethroid of bifenthrin; and
    (c) at least one mitochondrial complex III electron transport inhibitor of bifenazate.

* * * * *